United States Patent [19]

Aono

[11] 4,071,003
[45] Jan. 31, 1978

[54] CONTROL SYSTEM FOR ENGINE EXHAUST GAS RECIRCULATION ACCORDING TO ENGINE OPERTIONAL CONDITION

[75] Inventor: Shigeo Aono, Seki, Japan

[73] Assignee: Nissan Motor Co., Ltd., Japan

[21] Appl. No.: 711,521

[22] Filed: Aug. 4, 1976

[30] Foreign Application Priority Data

Aug. 5, 1975 Japan .................................. 50-94747

[51] Int. Cl.² .......................................... F02M 25/06
[52] U.S. Cl. .............................................. 123/119 A
[58] Field of Search ..................................... 123/119 A

[56] References Cited

U.S. PATENT DOCUMENTS

| | | | |
|---|---|---|---|
| 3,872,846 | 3/1975 | Taplin et al. | 123/119 A |
| 3,925,989 | 12/1975 | Pustelnik | 123/119 A |
| 3,941,105 | 3/1976 | Yagi et al. | 123/119 A |
| 3,963,011 | 6/1976 | Saito et al. | 123/119 A |

FOREIGN PATENT DOCUMENTS

| | | | |
|---|---|---|---|
| 2,143,435 | 3/1973 | Germany | 123/119 A |
| 2,449,954 | 4/1975 | Germany | 123/119 A |
| 2,062,067 | 9/1975 | Germany | 123/119 A |
| 2,508,736 | 6/1972 | Germany | 123/119 A |

*Primary Examiner*—Wendell E. Burns
*Attorney, Agent, or Firm*—Robert E. Burns; Emmanuel J. Lobato; Bruce L. Adams

[57] ABSTRACT

A control system comprising a flow control valve provided in an exhaust gas recirculation passage, an electromechanical valve-actuator for actuating the flow control valve and a control circuit including function generators and an adder, optionally combined with a multiplier, for producing a control signal to operate the valve-actuator. Each function generator receives a signal representing one of several variables related to the operational condition of the engine, e.g. the opening degree of the throttle valve and engine temperature, and produces an output signal indicating and corresponding to a desirable opening degree of the flow control valve based on the assigned variable. The output signals of the function generators are respectively modulated in amplitude according to the respective importance of the variables to the exhaust recirculation control and then combined together by the adder.

12 Claims, 6 Drawing Figures

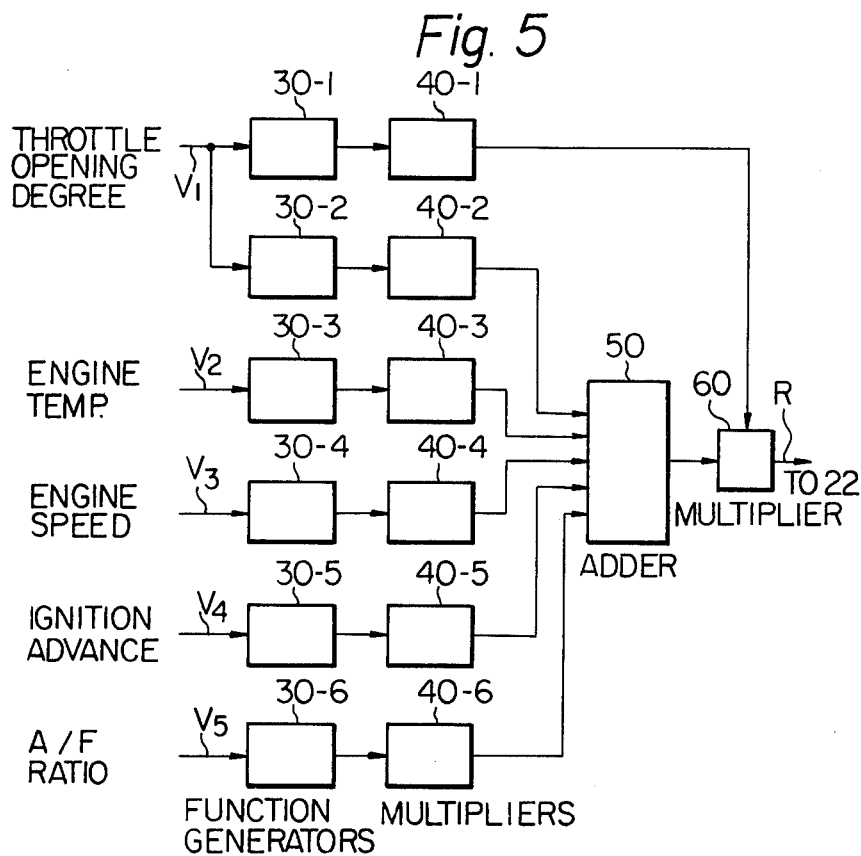
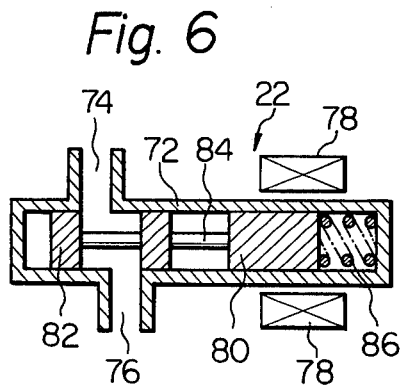

CONTROL SYSTEM FOR ENGINE EXHAUST GAS RECIRCULATION ACCORDING TO ENGINE OPERATIONAL CONDITION

BACKGROUND OF THE INVENTION

This invention relates to an exhaust gas recirculation system in an internal combustion engine, and more particularly to a control system for controlling the quantity of the recirculated exhaust gas in appropriate relation to the operational condition of the engine.

It is one of effective and practicable measures against formation of nitrogen oxides NOx in the operation of an internal combustion engine, especially an automotive engine, to recirculate a portion of the exhaust gas to the intake system of the engine. The recirculation of the exhaust gas which contains large amounts of carbon dioxide causes a lowering of the maximum combustion temperature in the engine and results in suppression of the formation of NOx at the combustion of an air-fuel mixture. An exhaust gas recirculation system for this purpose consists fundamentally of a recirculation passage, which branches from the exhaust line and terminates at either a certain section of the induction passage or the intake manifold, and a flow control valve mechanism for regulating the quantity of the recirculated exhaust gas.

The provision of the flow control valve mechanism to the exhaust recirculation system is considered indispensable because the recirculation of exhaust gas is generally disadvantageous to the performance of the engine and stability of the engine operation at a variable extent depending on the operational condition of the engine. The extent of the disadvantageousness is greatest when the engine is either at idle or in operation at relatively low engine temperatures.

In a typical example of conventional flow control valve mechanisms in the exhaust recirculation system, a flexible diaphragm is arranged to govern the position of a valve member for controlling the effective cross-sectional area of the recirculation passage in response to the magnitude of vacuum created at a certain section of the engine intake system. To relate the exhaust recirculation to the engine temperature, usually an on-off functioning electromagnetic valve is utilized in combination with a temperature sensor so that the recirculation passage may be blocked when the engige temperature is below a predetermined temperature.

In reality, both the influence of the exhaust recirculation on the efficiency and stability of the engine and the quantity of NOx produced in the engine greatly depend on numerous variables which are related to the operational condition of the engine. Examples of such variables are the rate of acceleration or deceleration, engine temperature, engine speed, ignition timing and air/fuel ratio of a combustible mixture fed to the engine. The quantity of the recirculated exhaust gas in conventional exhaust recirculation systems is not controlled in direct relation to these variables, so that the engine operation is unfavorably influenced by the exhaust recirculation to an extent by far the greater than a minimal or tolerable one. Besides, a mechanical valve-actuating means such as a vacuum-responsive diaphragm does not always make a very quick response to a change in the engine operational condition.

SUMMARY OF THE INVENTION

With respect to an internal combustion engine, it is an object of the present invention to provide an improved exhaust recirculation control system, which produces an electrical control signal exactly representing the operational condition of the engine and controls, on the basis of this signal, the position of a valve member in an exhaust gas recirculation passage, so that the quantity of the recirculated exhaust gas can always been controlled in a manner most appropriate for maintaining a smooth engine operation with an optimum balance between the engine performance and the suppression of NOx formation over the entire range of the engine operational condition.

A control system according to the invention comprises a flow control valve provided to the exhaust recirculation passage, at least two different sensor means for producing individually an electrical signal representing the magnitude of one of variables related to the operational condition of the engine, a control circuit for producing a control signal based on all the electrical signals produced by the sensor means, and a valve-actuating means for varying the opening degree of the flow control valve in response to the control signal. The control circuit has at least two function generators arranged to individually receive one of the electrical signals produced by the sensor means and individually produce an output signal indicating a desirable opening degree of the flow control valve based on the assigned electrical signal, and an arithmetic operation circuit constructed such that the output signals of the function generators are respectively modulated in amplitude according to the respective and relative importance of the variables to the control of the opening degree of the flow control valve and then united together in a predetermined manner to produce the control signal.

Examples of the variables related to the operational condition of the engine are the opening degree of a throttle valve for the engine, engine temperature, engine speed, the degree of the ignition advance and the air-fuel ratio of a combustible mixture fed to the engine.

The arithmetic operation circuit is made up of, for example, at least two multipliers respectively connected to the function generators for individually multiplying the received output signal of the assigned function generator by a constant and an adder for producing the control signal by adding up all the outputs of the multipliers.

Alternatively, the arithmetic operation circuit may have another multiplier which multiplies the output of the adder by a definite one of the output signals of the aforementioned multipliers, the definite one output signal not being introduced into the adder but being directly applied to the supplemented multiplier. In this case, one of the variables having a great importance to the control of the quantity of the recirculated exhaust gas is assigned to the function generator which is not connected to the adder but connected to the supplemented multiplier. When the opening degree of the throttle valve is chosen in this respect, this function generator preferably includes a differentiation circuit for producing an output signal indicating whether the opening degree of the throttle valve is varying or constant.

BRIEF DESCRIPTION OF THE DRAWINGS

The invention will fully be understood from the following detailed description of a preferred embodiment with reference to the accompanying drawings, wherein:

FIG. 5 is a block diagram showing a slight modification of the control system of FIG. 2; and FIG. 6 is a longitudinal sectional view of an example of the flow control valve in the control system of FIG. 1.

DESCRIPTION OF THE PREFERRED EMBODIMENTS

Figure 1:
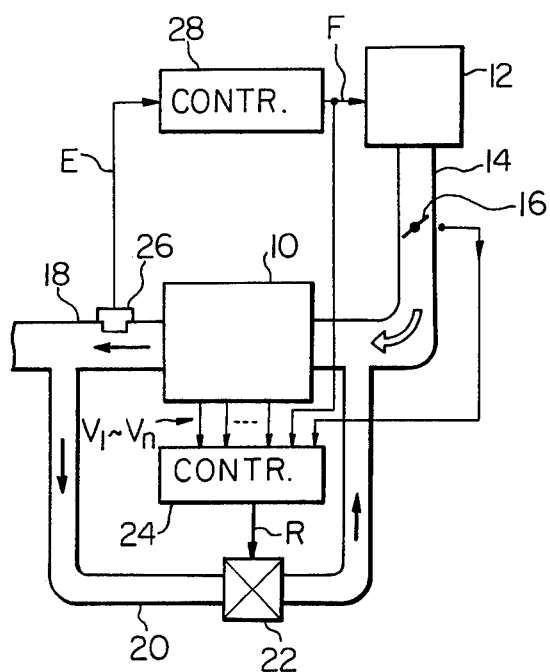
FIG. 1 is a block diagram of an engine exhaust gas recirculation system including a control system according to the invention.

Referring to FIG. 1, an internal combustion engine 10 is provided with a controlled fuel supply means 12 such as a carburetor or a fuel injection apparatus, so that an air-fuel mixture is supplied to the engine 10 through an induction passage 14 which is provided with a usual throttle valve 16. The engine 10 is provided with an exhaust pipe 18 in a usual manner, and an exhaust gas recirculation passage 20 branches from the exhaust pipe 18 (or an exhaust manifold which is omitted from the illustration) and interconnects it to the induction passage 14 at a section, for example, downstream of the throttle valve 16. A flow control valve 22 (including a valve member and a valve-actuating means) is arranged to regulate the volumetric flow rate of the recirculating exhaust gas by varying the effective cross-sectional of the recirculation passage at a section thereof.

The actuating-means of the control valve 22 is responsive to an electrical signal and can move the valve member to any position between a fully closed position and a maximumly opened position. A control circuit 24 according to the invention is constructed as will hereinafter be described to produce a control signal R, which is applied to the actuating means of the control valve 22, based on a plurality of electrical signals $V_1, V_2 \ldots V_n$ each representing one of variables related to the operational condition of the engine 10 such as the degree of the opening of the throttle valve 16, engine temperature, engine speed and the ignition timing (ignition advance).

The engine 10 may optionally be provided with a conventional air-fuel ratio control system including an exhaust gas sensor 26 disposed in the exhaust pipe 18 and a control circuit 28, which supplies an electrical control signal F to the fuel supply means 12 in response to an electrical signal E produced by the sensor 26. The exhaust gas sensor 26 senses the concentration of a component of the exhaust gas, which concentration has dependence on the air-fuel ratio of an air-fuel mixture consumed in the engine 10. In many cases, the concentration of oxygen in the exhaust gas is taken as the object of the measurement with the sensor 26, but the concentration of a different component such as CO, HC or NOx may alternatively be sensed. The control signal F so varies as to minimize the deviation of the air-fuel ratio realized in the combustion chambers of the engine 10 from the intended ratio.

When this air-fuel ratio control system is provided, it is preferable to employ the air-fuel ratio as one of the variables for determining the exhaust recirculation control signal R. It will be convenient to utilize the control signal F from the control circuit 28 as one of the input signals V to the control circuit 24.

At least two of the above described variables related to the operational condition of the engine 10 should be sensed and transformed into the electrical input signals V for the control circuit 24. It is most preferable that the selected variables always include the degree of the opening of the throttle valve 16. Every one of the above described variables can be sensed and transformed into an electrical signal by a known technique. For example, the opening degree of the throttle valve 16 can be sensed by means of a potentiometer (not shown).

Figure 2:
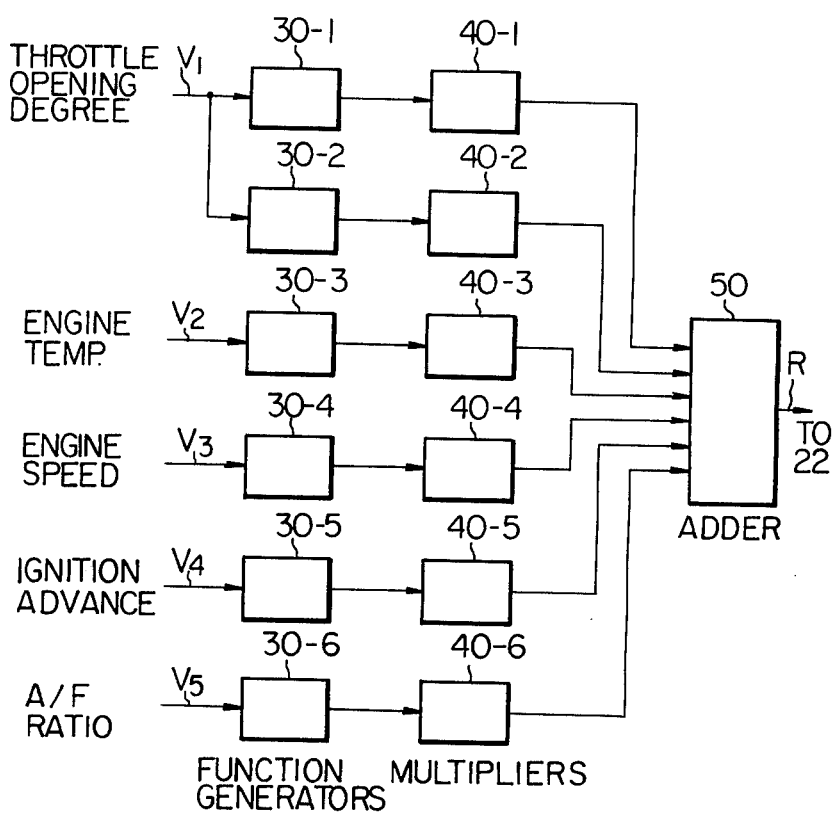
FIG. 2 is a block diagram of the control system in FIG. 1 as a preferred embodiment of the invention.

As a preferred embodiment, FIG. 2 shows the construction of the exhaust recirculation control circuit 24. In this case, the control circuit 24 is constructed to receive five different input signals $V_1$ to $V_5$ representing, respectively, the throttle valve opening degree, engine temperature, engine speed (r.p.m.), ignition timing (ignition advance) and the air-fuel ratio. The control circuit has six independent function generators 30-1 to 30-6. The first and second function generators 30-1 and 30-2 are different in operation from one another as will be described hereinafter but both receive the same throttle opening degree signal $V_1$. The third to sixth function generators 30-3 to 30-6 receive, respectively, the remaining four input signals $V_2$ to $V_5$. The control circuit 24 has six independent multiplication circuits or multipliers 40-1 to 40-6 and an addition circuit or adder 50. The multipliers 40-1 to 40-6 respectively receive the outputs of the function generators 30-1 to 30-6 and multiply the received signals individually by a constant. The relative values of the constants for the multiplication in the six multipliers 40-1 to 40-6 are predetermined according to the respective and relative importance of the variables represented by the signal $V_1$ to $V_5$ to the determination of the control signal R. The adder 50 accomplishes the addition of the outputs of the multipliers 40-1 to 40-6 to produce the control signal R.

Figure 3:
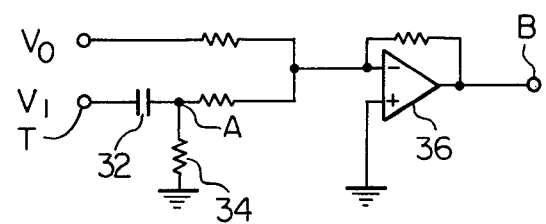
FIG. 3 is an exemplary circuit diagram of a function generator in the control system of FIG. 2.
Figure 4:
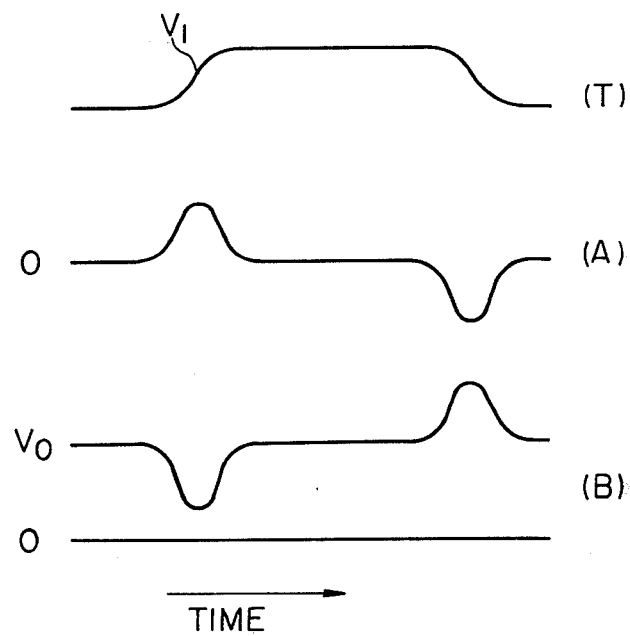
FIG. 4 is a chart showing the function of the circuit of FIG. 3.

The first function generator 30-1 detects the rate of increase or decrease in the throttle valve opening from the input signal $V_1$ and produces an output signal representing the detected increase or decrease rate. This function generator 30-1 is constructed, for example, as shown in FIG. 3. The input signal $V_1$ is supplied to a differentiation circuit made up of a capacitance 32 and a resistance 34. The output of this differentiation circuit is applied to an operational amplifier 36 with the addition of a constant voltage $V_0$. When the throttle opening degree or the amplitude of the input signal $V_1$ at the input terminal T of the differentiation circuit varies as shown at (T) in FIG. 4, a voltage signal is provided at the output terminal A of the differentiation circuit as shown at (A) only when the amplitude of the input signal $V_1$ is in a transition state. The amplitude (absolute value) of this output signal depends on the rate of a change in the amplitude of the signal $V_1$, i.e. the speed of the opening or closing movement of the throttle valve 16. Accordingly, the operational amplifier 36 produces a voltage signal (which is the output signal of the function generator 30-1) at the output terminal B as shown at (B) in FIG. 4. Thus, the output of the first function generator 30-1 so acts on the quantity of the recirculated exhaust gas as to decrease while the throttle valve 16 is opening (the engine is in an accelerating condition) but increase while the throttle valve 16 is closing (decelerating).

The second function generator 30-2 receives the same input signal $V_1$ as the first function generator 30-1 does, but produces a differently modulated output signal to cause the quantity of the recirculated exhaust gas to decrease when the throttle opening degree is either near the maximum (the engine 10 is in high output operation) or near the minimum (the engine 10 is idling) but increase at moderate throttle opening degrees.

The third function generator 30-3 receives the engine temperature signal $V_2$ and produces an output signal, which functions to increase the quantity of the recirculated exhaust gas as the engine temperature rises from a minimum quantity at engine temperatures below a predetermined temperature. This output signal has a constant amplitude while the engine temperature is above another predetermined temperature, indicating the completion of the warming up of the engine 10.

The input signal $V_3$ to the fourth function generator 30-4 represents the engine speed. Although the relationship between the engine speed and an optimum quantity of the recirculated exhaust gas should be determined according to the characteristic of the engine 10, the output signal of the fourth function generator 30-4 usually takes such a form that the quantity of the recirculated exhaust gas decreases at low engine speeds and increases at medium engine speeds.

The fifth function generator 30-5 receives the input signal $V_4$ representing the degree of the ignition advance. In general, NOx are produced in an increasing quantity as the ignition advance becomes greater. Accordingly the fifth function generator 30-5 produces an output signal which functions to increase the quantity of the recirculated exhaust gas as the ignition advance becomes greater and vice versa.

The sixth function generator 30-6 receives the air-fuel ratio signal $V_5$ and produces an output signal which takes such a form that the quantity of the recirculated exhaust gas increases at high air-fuel ratios (operation with a lean mixture) and decreases at low air-fuel ratios (operation with a rich mixture).

The outputs of these six function generators 30-1 to 30-6 are multiplied respectively by different constants as hereinbefore described in the six multipliers 40-1 to 40-6 and then applied to the adder 50. Accordingly the output of the adder 50, i.e. the control signal R, properly and always represents the operational condition of the engine 10.

The control circuit 24 may alternatively be constructed as shown in FIG. 5. In this embodiment, the function generators 30-1 to 30-6, the multipliers 40-1 to 40-6 and the adder 50 have received substantially no modification. As a fundamental difference from the construction of FIG. 2, the control circuit includes a multiplication circuit 60, and the output of the first function generator 30-1 is applied, after the modulation in the first multiplier 40-1, to this multiplication circuit 60, not to the adder 50. The output of the remaining function generators 30-2 to 30-6 are respectively modulated in the multipliers 40-2 to 40-6 as in the case of FIG. 2 and applied to the adder 50. The output of the adder 50 is not directly utilized as the control signal R but is multiplied by the output of the first multiplier 40-1 in the multiplication circuit 60. In this case, the control signal R is the output of this circuit 60. In the control circuit 24 of FIG. 5, the output of the first function generator 30-1 which represents the mode of a transient state of the engine operation (the rate of acceleration or deceleration) is dominant over the signals related to all the other variables in producing the control signal R. Accordingly, the control of the quantity of the recirculated exhaust gas during acceleration or deceleration can be accomplished particularly in a desirable manner. Of course it is permissible to multiply the output of the adder 50 by any one of the outputs of the other function generators 30-2 to 30-6 (as an alternative to the output of the first function generator 30-1) if the importance of the particular signal is predominant over the others.

FIG. 6 shows an embodiment of the flow control valve 22 in the exhaust recirculation control system of FIG. 1. A generally cylindrical housing 72 has an inlet port 74 and an outlet port 76 formed in the side wall. When the valve 22 of FIG. 6 is applied to the exhaust recirculation passage 20, a fluid passage formed in the housing 72 between the inlet and outlet ports 74 and 76 constitutes part of the recirculation passage 20, and the quantity of the recirculated exhaust gas is determined by the effective cross-sectional area of the inlet port 74.

A solenoid coil 78 is arranged around the housing 72, and a cylindrical solenoid plunger 80 is slidably received in the housing 72. A cylindrical valve member 82 is slidably received in the housing 72 such that the effective cross-sectional area of the inlet port 74 is varied according to the position of the valve member 82. A rod or spool 84 connects the valve member 82 to the solenoid plunger 80, and a compression spring 86 is installed in the housing 72 to bias the solenoid plunger 80 and hence the valve member 82 in a direction, for example, to increase the effective cross-sectional area of the inlet port 74. When the control signal R is applied to the coil 78, the solenoid plunger moves against the force of the spring 86, so that the position of the valve member 82 is determined by the relationship between the force of the spring 86 and the amplitude of the control signal R.

If the friction between the valve member 82 and/or the plunger 80 and the wall of the housing 72 offers a significant resistance to the movement of the plunger 80 and the valve member 82, it is recommended to incorporae a high frequency A.C. signal, which may be a sinusoidal wave, a triangular wave or a ripple signal, in the control signal R as a dither component.

As seen from the foregoing description, all the variables chosen as the basis for the control of the exhaust recirculation are transformed into and treated as electrical signals in the present invention. It is possible, therefore, to easily and variously combine numerous variables to produce an exhaust recirculation control signal which indicates an optimum quantity of the recirculated exhaust gas at every point in the entire range of the operational condition of the engine 10. As the result, the engine 10 can be operated always with maximum profit of the exhaust recirculation and with minimized degradation of the performance or the efficiencies attributable to the exhaust recirculation. Besides, a control system of the invention features a quicker response than conventional control systems and exclusion of mechanical control elements which are liable to offer unfavorable problems to the accuracy of the control because of certain factors such as friction or hysteresis. If necessary, it is also possible to make a control system of the invention exhibit certain delay in responding to a change in the operational condition of the engine 10.

What is claimed is:

1. In an internal combustion engine provided with a throttle valve in the intake system and an exhaust gas recirculation system for recirculating a portion of the exhaust gas to the engine including a recirculation passage interconnecting the exhaust line to the intake system, a control system for controlling the quantity of the recirculated exhaust gas comprising:
- a flow control valve provided in the recirculation passage;
- at least two different sensor means for producing individually an electrical signal representing and corresponding to the magnitude of one of variables related to the operational condition of the engine;
- at least two function generators arranged to individually receive a respective one of the electrical signals produced by said at least two sensor means and individually produce an output signal corresponding to a desirable opening degree of said flow control valve based on the assigned electrical signal;
- an arithmetic operation circuit connected to said at least two function generators to modulate respectively in amplitude the outputs of the two function generators according to the respective and relative importance of said variables to the control of the opening degree of said flow control valve and means to produce from the two modulated outputs a control signal;
- valve-actuating means for varying the opening degree of said flow control valve in response to said control signal, said arithmetic operation circuit comprising at least two multipliers respectively connected to said at least two function generators to individually multiply the output signal produced by the assigned function generator by a constant, an adder for producing an output signal by adding up all the outputs of said at least two multipliers except for a definite output and another multiplier arranged to produce said control signal by multiplying said output signal of said adder by said definite output, and the function generator connected to the multiplier which provides said definite output being assigned to a definite one of said variables having a great importance to the control of the opening degree of said flow control valve.

2. A control system as claimed in claim 1, wherein said definite one of said variables corresponds to the degree of opening of the throttle valve, the function generator assigned to said definite one of said variables having a differentiation circuit to differentiate the received electrical signal and an operational amplifier to provide an inversed addition of a constant to the output of said differentiation circuit such that the output signal of this function generator implies that the opening degree of said flow control valve is decreased and increased when the opening degree of the throttle valve is increasing and decreasing, respectively.

3. A control system as claimed in claim 1, wherein said valve-actuating means comprises a solenoid coil to which said control signal is applied, a solenoid plunger, in combination with said solenoid coil, mechanically connected to said flow control valve and a mechanical biasing means for so biasing said solenoid plunger in a direction to keep the opening degree of said flow control valve at a predetermined degree, said solenoid coil and said solenoid plunger being arranged such that said solenoid plunger moves against the biasing force thereby to vary said degree of opening of said flow control valve according to the amplitude of said control signal.

4. In an internal combustion engine provided with a throttle valve in the intake system and an exhaust gas recirculation system for recirculating a portion of the exhaust gas to the engine including a recirculation passage interconnecting the exhaust line to the intake system, a control system for controlling the quantity of the recirculated exhaust gas comprising:
- a flow control valve provided in the recirculation passage;
- at least two different sensor means for producing individually an electrical signal representing and corresponding to the magnitude of one of variables related to the operational condition of the engine;
- at least two function generators arranged to individually receive a respective one of the electrical signals produced by said at least two sensor means and individually produce an output signal corresponding to a desirable opening degree of said flow control valve based on the assigned electrical signal;
- an arithmetic operation circuit connected to said at least two function generators to modulate respectively in amplitude the outputs of the two function generators according to the respective and relative importance of said variables to the control of the opening degree of said flow control valve and means to produce from the two modulated outputs a control signal;
- valve-actuating means for varying the opening degree of said flow control valve in response to said control signal, said variables including the degree of opening of the throttle valve, a first one of said at least two function generators arranged to receive a first electrical signal representing the opening degree of the throttle valve having a differentiation circuit to differentiate the received electrical signal and an operational amplifier to provide an inversed addition of a constant to the output of said differentiation circuit such that the output signal of said first one function generator implies that the opening degree of said flow control valve is decreased and increased when the opening degree of the throttle valve is increasing and decreasing, respectively, a second one of said at least two function generators being connected for also receiving said first electrical signal and the output of said second function generator implies that the opening degree of said flow control valve is decreased when the opening degree of the throttle valve is either near the maximum or near the minimum but otherwise increased.

5. A control system as claimed in claim 4, wherein said at least two function generators are at least three and include a third function generator, which receives a second electrical signal representing and corresponding to the engine temperature and an output thereof implies that the opening degree of said flow control valve is increased as the engine temperature increases until the engine temperature reaches a predetermined temperature and remains substantially constant when the engine temperature is above said predetermined temperature.

6. A control system as claimed in claim 5, wherein said at least two function generators are at least four and include a fourth function generator, which receives a third electrical signal representing the engine speed and an output thereof implies that the opening degree of said flow control valve is increased and decreased when the engine speed is relatively high and relatively low, respectively.

7. A control system as claimed in claim 6, wherein said at least two function generators are at least five and include a fifth function generator, which receives a fourth electrical signal representing and corresponding to the air-to-fuel ratio of a combustible mixture fed to the engine and an output thereof implies that the opening degree of said flow control valve is increased and decreased when the air-to-fuel ratio is relatively high and relatively low, respectively.

8. A control system as claimed in claim 7, wherein the engine is a spark ignition engine, said at least two function generators being at least six, a sixth function generator receiving a fifth electrical signal representing and corresponding to the degree of the ignition advance and an output thereof implies that the opening degree of said flow control valve is increased and decreased when the ignition advance is relatively great and relatively small, respectively.

9. A control system as claimed in claim 8, wherein said arithmetic operation circuit comprises six multipliers respectively connected to said first to sixth function generators to individually multiply the output signal produced by the assigned function generator by a constant, and an adder to produce said control signal by adding up all the outputs of said six multipliers.

10. A control system as claimed in claim 8, wherein said arithmetic operation circuit comprises six multipliers respectively connected to said first to sixth function generators to individually multiply the output signal produced by the assigned function generator by a constant, an adder connected to produce an output signal by adding up the outputs of five of said sixth multipliers respectively connected to said second to sixth function generators, and another multiplier connected to produce said control signal by multiplying said output signal produced by said adder by the output of one of said six multipliers connected to said first function generator.

11. In an internal combustion engine provided with a throttle valve in the intake system and an exhaust gas recirculation system for recirculating a portion of the exhaust gas to the engine including a recirculation passage interconnecting the exhaust line to the intake system, a control system for controlling the quantity of the recirculated exhaust gas comprising:

a flow control valve provided in the recirculation passage;

at least two different sensor means for producing individually and electrical signal representing and corresponding to the magnitude of one of variables related to the operational condition of the engine, said variables including the degree of opening of the throttle valve;

at least two function generators arranged to individually receive a respective one of the electrical signals produced by said at least two sensor means and individually produce an output signal corresponding to a desirable opening degree of said flow control valve based on the assigned electrical signal;

at least two multipliers respectively connected to said at least two function generators and constructed to individually multiply the output signal produced by the assigned function generator by a constant and an adder for producing said control signal by adding up all the outputs of said at least two multipliers; and a valve-actuating means for varying the opening degree of said flow control valve in response to said control signal.

12. A control system as claimed in claim 11, including means for applying as said variables engine temperature and engine speed.

* * * * *